United States Patent [19]

Anada et al.

[11] Patent Number: 5,363,774
[45] Date of Patent: Nov. 15, 1994

[54] COMPACT X-Y TABLE ASSEMBLY

[75] Inventors: Katsuya Anada, Gifu; Yukio Yoshioka, Kawaguchi, both of Japan

[73] Assignee: Nippon Thompson Co., Ltd., Tokyo, Japan

[21] Appl. No.: 911,608

[22] Filed: Jul. 10, 1992

[30] Foreign Application Priority Data

Dec. 7, 1991 [JP] Japan .................................. 3-198424

[51] Int. Cl.$^5$ ........................ A47B 11/00; A47B 85/00
[52] U.S. Cl. ..................... 108/143; 33/1 M; 108/20; 108/21; 248/913
[58] Field of Search ................. 33/1 M; 108/20, 21, 108/22, 143; 248/913

[56] References Cited

U.S. PATENT DOCUMENTS

| | | | |
|---|---|---|---|
| 3,258,776 | 6/1966 | Boyle et al. | 33/1 M |
| 3,486,629 | 12/1969 | Slaga | 108/20 |
| 3,801,090 | 4/1974 | Gillen | 248/913 X |
| 4,714,025 | 12/1987 | Wallin et al. | 108/20 |
| 4,938,441 | 7/1990 | Hannah et al. | 108/143 X |
| 5,037,163 | 8/1991 | Hatcher | 108/143 X |
| 5,152,099 | 10/1992 | Nilssen | 108/21 X |

Primary Examiner—Clifford D. Crowder
Assistant Examiner—John J. Calvert
Attorney, Agent, or Firm—Skjerven, Morrill, MacPherson, Franklin & Friel

[57] ABSTRACT

An X-Y table assembly including a first, second and third tables all fabricated from a sheet metal by bending is provided. Each of the first, second and third tables includes a bent section formed with a guide groove, and two associated guide grooves of any adjacent two of the tables are located opposite to each other to define a guide groove in which a plurality of rolling members are provided. Thus, a linear relative motion can be provided between the first and second tables in X direction, and another linear relative motion can be provided between the second and third tables in Y direction.

3 Claims, 8 Drawing Sheets

COMPACT X-Y TABLE ASSEMBLY

BACKGROUND OF THE INVENTION

1. Field of the Invention

This invention generally relates to a table assembly including a table which may move in a desired direction, and, in particular, to an X-Y table assembly suitable for use in various smaller-sized machines and devices.

2. Description of the Prior Art

An X-Y table assembly is well known in the art. Typically, such an X-Y table assembly includes a base, an X table mounted on the base slidably in X direction and a Y table mounted on the X table slidably in Y direction, thereby allowing the Y table to move in any direction in a plane relative to the base.

A typical prior art X-Y table assembly is illustrated in FIGS. 12 through 14. As shown, the X-Y table assembly includes a base 30, an X table 34 located above the base 30, a first pair of linear motion guide units 31 interposed between the base 30 and the X table 34, a Y table 38 located above the X table 34, and a second pair of linear motion guide units 35 interposed between the X table 34 and the Y table 38. Each of the first pair of linear motion guide units 31 includes an elongated rail 32 fixedly mounted on the base 30 extending in the X direction and a slider 33 slidably mounted on the rail 32 and fixedly attached to the X table 34. A plurality of rolling members, such as balls or rollers, are disposed between the rail 32 and the slider 33 to provide a rolling contact therebetween. Thus, the X table 34 may move in either direction along the X direction relative to the base 30. Similarly, each of the second pair of linear motion guide units 35 includes an elongated rail 36 fixedly mounted on the top surface of the X table 34 extending in the Y direction, normal to the X direction, and a slider 37 slidably mounted on the rail 36 and fixedly attached to the Y table 38. A plurality of rolling members are also provided between the rail 36 and the slider 37 so as to provide rolling contact therebetween. As a result, the Y table 38 may move in either direction along the Y direction relative to the X table 34, so that, in effect, the Y table 38 may move in any direction in a plane relative to the base 30.

In this prior art X-Y table assembly, use is made of three plates for base 30 and X and Y tables 34 and 38 and two pairs of linear motion guide units 31 and 35 to construct an X-Y table assembly. In this case, however, since separate components are assembled to construct an X-Y table assembly, there is a limit in making the overall size smaller and the accuracy cannot be high. In addition, the manufacturing cost tends to be expensive because of involvement of various assembling steps.

Another typical prior art X-Y table assembly is illustrated in FIG. 15, and, as shown, it generally includes a base block 39, an intermediate block 40 and a top block 41. The base block 39 is formed with a pair of upward projections, and the intermediate block 40 is formed with a pair of downward projections, each associated with one of the upward projections of the base block 39. A linear motion guide unit 42 is interposed between the associated pair of upward and downward projections. The linear motion guide unit in this case may include a pair of oppositely located guide members, each having a V-shaped groove, and a plurality of rolling members, such as balls or rollers, interposed between the oppositely located guide members to thereby provide a rolling contact therebetween.

The intermediate block 40 is formed with a pair of upward projections and the top block 41 is foraged with a pair of downward projections, each associated with a corresponding one of the upward projections of the intermediate block 40. Similarly, a linear motion guide unit 42 is interposed between the associated pair of upward and downward projections of the intermediate and top blocks 40 and 41. In this case, each of the blocks 39-41 is fabricated by forging and cutting so that they are relatively large in size as well as in weight. Thus, the resulting X-Y table assembly is rather large in size and heavy in weight, though it may be suited for sustaining a relatively large load. There is apparently a limit in making this kind of X-Y table assembly smaller in size and light in weight.

SUMMARY OF THE INVENTION

In accordance with the present invention, there is provided a table assembly generally including three shaped plates, each made from a sheet metal by bending, and a plurality of rolling members interposed between any two adjacent plates.

That is, the present table assembly includes a first plate which is fabricated from a sheet metal by bending to provide at least two main first guide grooves spaced apart from each other and extending in parallel to each other. The assembly also includes a second plate which is also fabricated from a sheet metal by bending to provide at least two auxiliary first guide grooves, each associated with a corresponding one of the main first guide grooves of the first plate to define a first guide channel, at one side, and also at least two main second guide grooves spaced apart from each other and extending in parallel to each other, but in a direction different from that of the first guide grooves, at an opposite side. The assembly also includes a third plate which is also fabricated from a sheet metal by bending to provide at least two auxiliary second guide grooves, each associated with a corresponding one of the main second guide grooves of the second plate to define a second guide channel. Also provided in the present table assembly are a plurality of rolling members, balls or rollers, provided in each of the first and second guide channels to provide a rolling contact between the first and second plates and also between the second and third plates.

In the preferred embodiment, the first and second guide grooves extend perpendicularly to each other so that the second plate moves in X direction relative to the first plate and the third plate moves in Y direction, perpendicular to the X direction, relative to the second plate.

In this manner, in accordance with the present invention, since each of the plates is fabricated from a sheet metal and a guide channel is defined by bending a part of the sheet metal, the number of components is minimized. Therefore, the overall size of the resulting table assembly can be made extremely compact in size and light in weight. Since the number of components required is minimized, it is easy to manufacture and low in cost. Moreover, since there is less number of steps required in assemblage, the table assembly may be made high in accuracy.

It is therefore a primary object of the present invention to provide an improved table assembly compact in size, light in weight and reduced in the number of components.

Another object of the present invention is to provide an improved table assembly high in accuracy but low at cost.

A further object of the present invention is to provide an improved X-Y table assembly suitable for use in various smaller-sized machines and equipment.

Other objects, advantages and novel features of the present invention will become apparent from the following detailed description of the invention when considered in conjunction with the accompanying drawings.

DESCRIPTION OF THE PREFERRED EMBODIMENTS

Referring first to FIGS. 1 through 4, an X-Y table assembly constructed in accordance with one embodiment of the present invention will be described in detail. As shown, the present table assembly includes a bottom table 1 which is fabricated from a sheet metal by bending the sheet metal into a desired shape. In the present embodiment, a pair of opposite side portions of a sheet metal is bent vertically upwardly so that the bottom table 1 has a generally U-shaped cross sectional shape. Thus, the bottom table 1 includes a pair of upstanding side wall sections 6 on its opposite sides. Each of the side wall sections 6 is formed with an outer guide groove 7.

Figure 1:
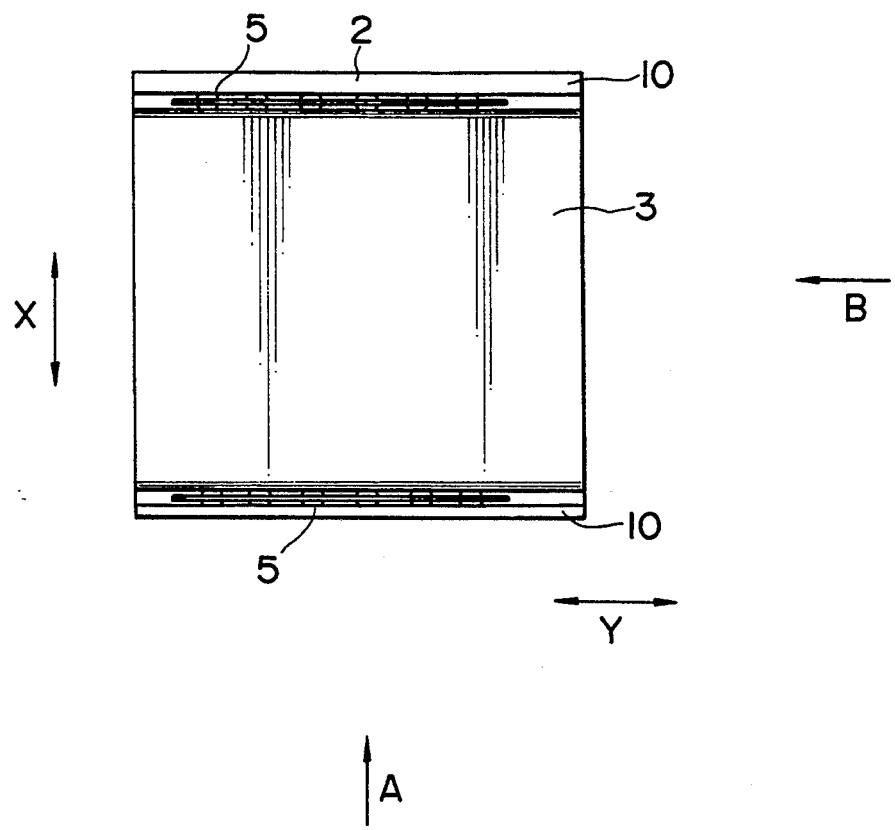
FIG. 1 is a schematic illustration showing in plan view an X-Y table assembly constructed in accordance with one embodiment of the present invention.
Figure 2:
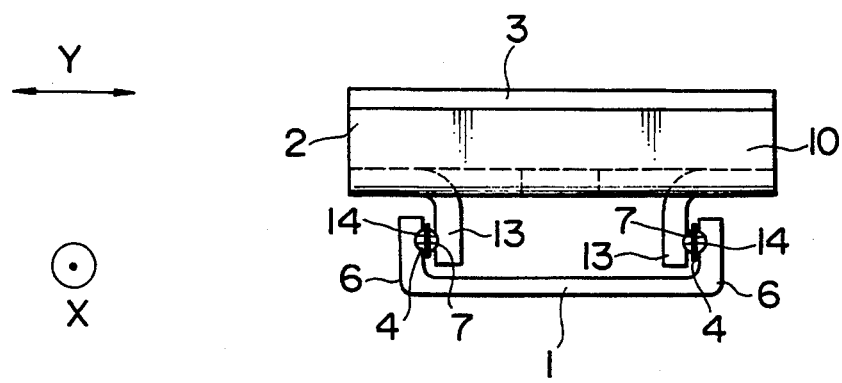
FIG. 2 is a schematic illustration showing in side elevation the X-Y table assembly of FIG. 1 when viewed in the direction of arrow A indicated in FIG. 1.
Figure 3:
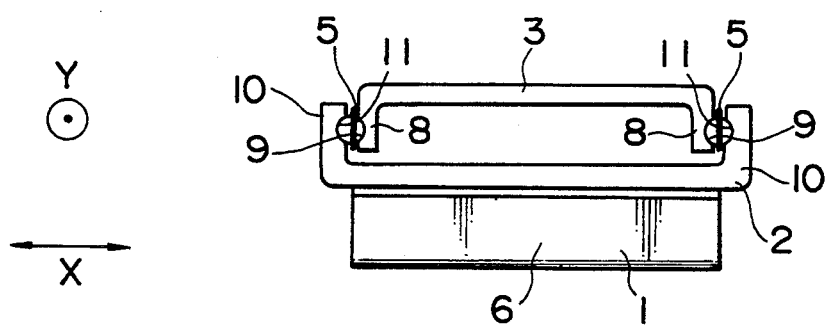
FIG. 3 is a schematic illustration showing in side elevation the X-Y table assembly of FIG. 1 when viewed in the direction of arrow B indicated in FIG. 1.
Figure 4:
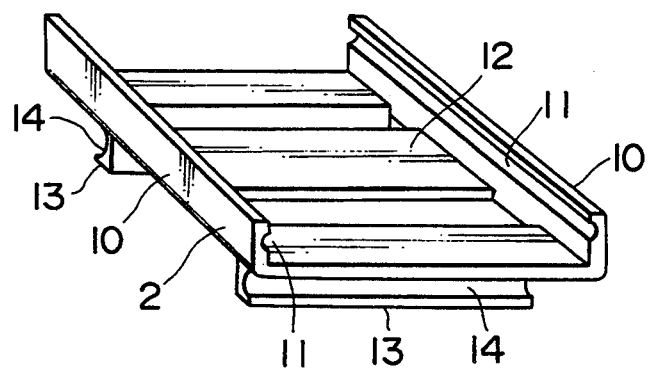
FIG. 4 is a schematic illustration showing in perspective view an intermediate table suitable for use in the table assembly shown in FIG. 1.

The table assembly also includes an intermediate table 2 which is also fabricated from a sheet metal by bending into a desired shape. In the illustrated embodiment, as best shown in FIG. 4, the intermediate table 2 includes a pair of vertically downwardly extending sections 13 which are formed by cutting selected portions of the sheet metal, for example, by stamping, and then bending the selected portions thus cut to extend downwardly. Each of the downwardly extending sections 13 is formed with an inner guide groove 14 located opposite to and extending in parallel with an associated one of the outer guide grooves 7 of the bottom table 1. Thus, a guide channel is defined between an associated pair of inner and outer guide grooves 14 and 7. A plurality of rolling members 4, or balls in the illustrated embodiment, are provided in each of the guide channels so that a rolling contact is provided between the bottom and intermediate tables 1 and 2. As a result, a linear relative motion can be provided between the bottom and intermediate tables 1 and 2 in X direction.

The intermediate table 2 is also provided with a pair of opposite side wall sections 10 along the opposite sides which are perpendicular to the downwardly extending sections 13. The side wall sections 10 are formed by bending the opposite side portions upwardly. Each of the side wall sections 10 is formed with an outer guide groove 11 at its inner side surface, which extends straight in Y direction which is perpendicular to the X direction.

The table assembly further includes a top table 3 which is also fabricated from a sheet metal by bending into a desired shape. In the illustrated embodiment, the top table 3 includes a flat bottom wall section and a pair of downwardly extending side wall sections 8, each of which is formed with an inner guide groove 9 at its outer side surface. Thus, the top table 3 has a cross section generally in the shape of an inverted-U. The top table 3 is generally located in the space defined by the pair of side wall sections 10 of the intermediate table 2 so that each of the inner guide grooves 8 is located opposite to and extending in parallel with an associated one of the outer guide grooves 11 of the intermediate table 2 to thereby define a guide channel therebetween. A plurality of rolling members 5, or balls in the illustrated embodiment, are also provided in each of these guide channels to provide a rolling contact between the intermediate table 2 and the top table 3. As a result, a linear relative motion can be provided between the intermediate and top tables 2 and 3 in Y direction.

As described above, since a linear relative motion in X direction can be provided between the bottom and intermediate tables 1 and 2 and a linear relative motion in Y direction can be provided between the intermediate and top tables 2 and 3, a relative translational motion in any direction can be provided between the bottom and top tables 1 and 3. It is to be noted that the bottom and top tables 1 and 3 are exchangeable so that the bottom table 1 may serve as a top table and vice versa.

Figure 5:
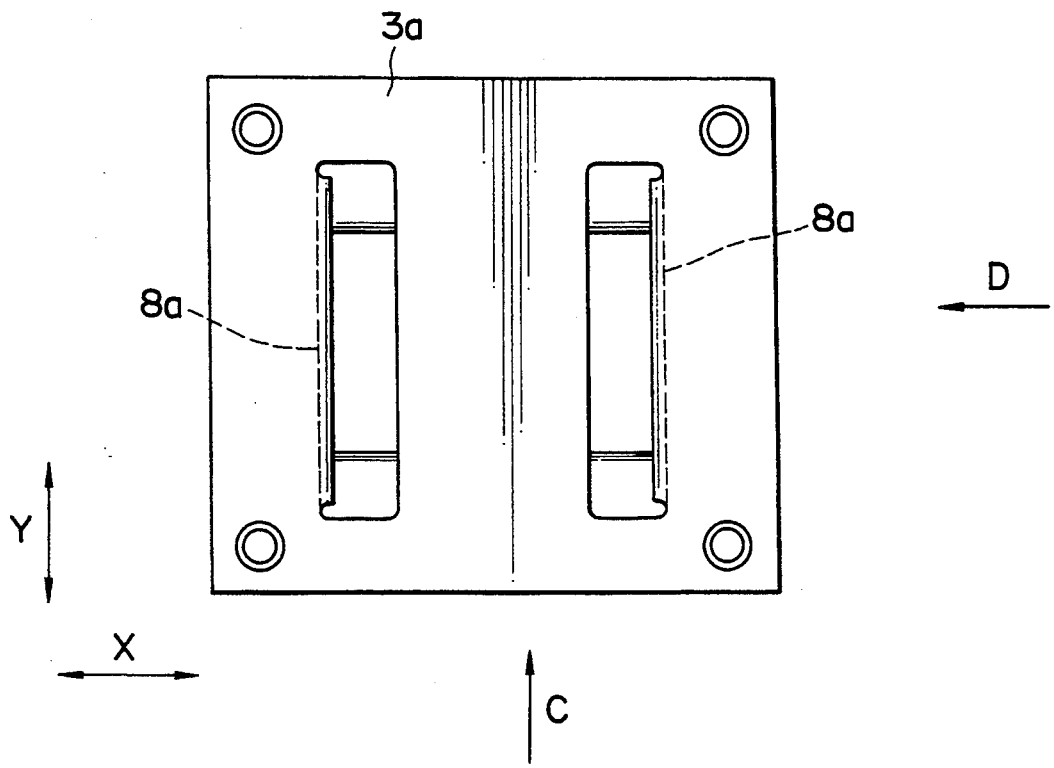
FIG. 5 is a schematic illustration showing in plan view an X-Y table assembly constructed in accordance with another embodiment of the present invention.
Figure 6:
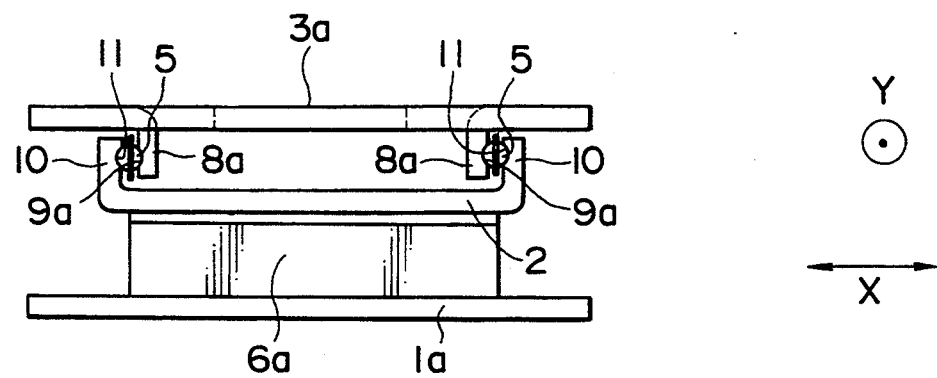
FIG. 6 is a schematic illustration showing in side elevation the X-Y table assembly of FIG. 5 when viewed in the direction of arrow C indicated in FIG. 5.
Figure 7:
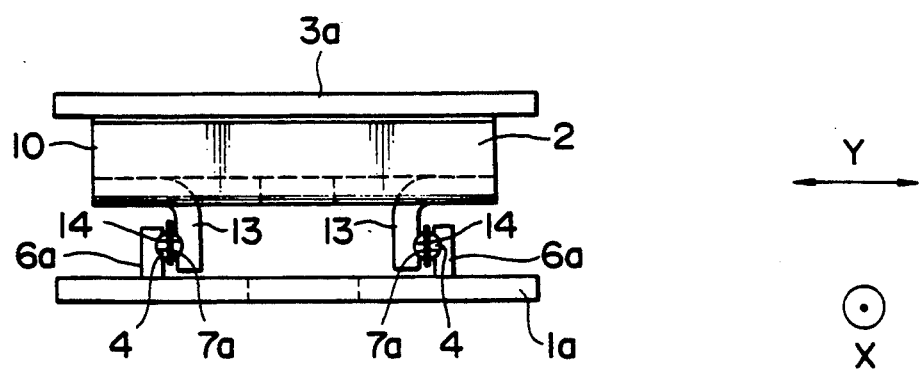
FIG. 7 is a schematic illustration showing in side elevation the X-Y table assembly of FIG. 5 when viewed in the direction of arrow D indicated in FIG. 5.
Figure 8:
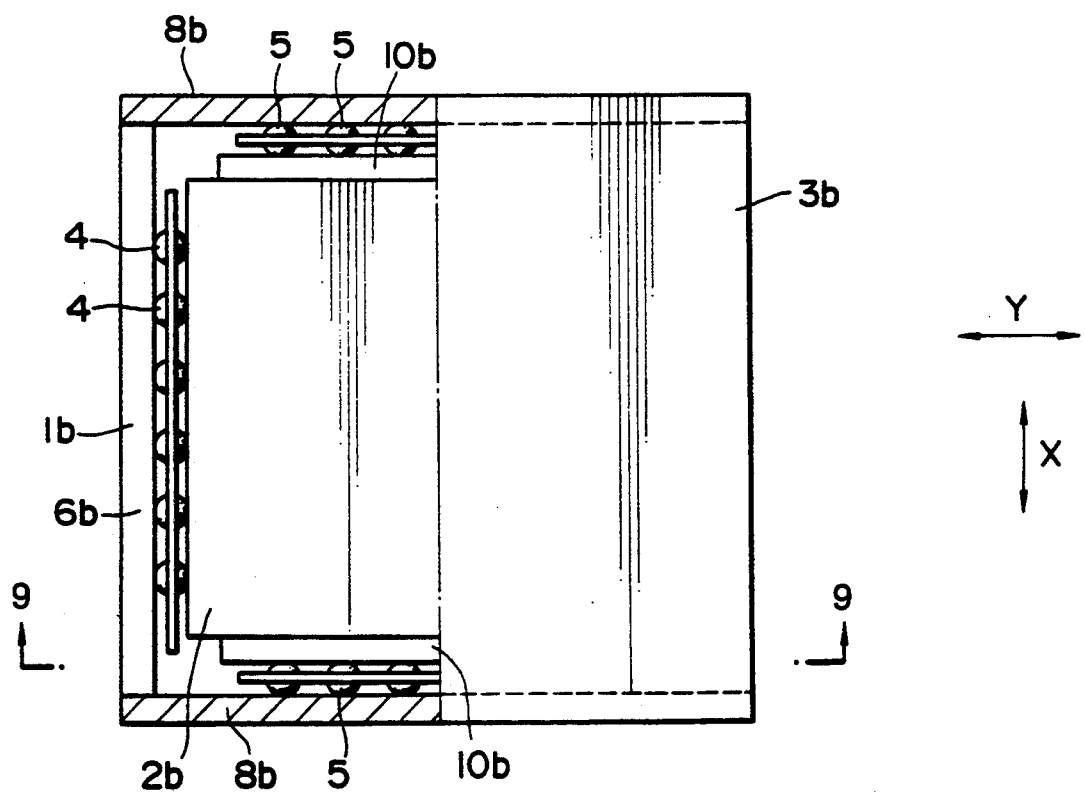
FIG. 8 is a schematic illustration showing partly in plan view and partly in cross section an X-Y table assembly constructed in accordance with a further embodiment of the present invention with the left half sectioned along line 8—8 indicated in FIG. 9.

Referring now to FIGS. 5 through 7, another embodiment of the present invention will be described in detail. The table assembly of this embodiment is basically same in structure as the first embodiment described above. For example, the present embodiment also includes a bottom table 1a, an intermediate table 2 which is the same intermediate table used in the first embodiment and a top table 3a. Thus, the bottom and top tables 1a and 3a are slightly different in structure from the corresponding tables 1 and 3 in the first embodiment. Thus, it is to be noted that like numerals indicate like elements throughout the specification and numerals followed by a lower class letter indicates a modified version of a corresponding element.

As shown in FIGS. 6 and 7, the bottom table 1a is also fabricated from a sheet metal by bending into a desired shape. For example, in the present embodiment, selected portions of a sheet metal are cut, for example, by stamping and the selected portions thus cut are bent vertically upwardly to define a pair of upwardly extending sections 6a, each of which is formed with an outer guide groove 7a located opposite to and in parallel with an associated one of the inner guide grooves 14 to thereby define a guide channel therebetween. A plurality of rolling members 4, or balls in the illustrated embodiment, are provided in the guide channel to provide a relative linear motion between the bottom and intermediate tables 1a and 2 in X direction.

The present table assembly also includes a top table 3a which is also made from a sheet metal by bending into a desired shape. In this embodiment, selected portions of a sheet metal are cut out and bent vertically downwardly to define a pair of vertically donwardly extending sections 8a, each of which is formed with an inner guide groove 9a in an opposed relationship with and in parallel with a corresponding one of the inner guide grooves 11 to thereby define a guide channel therebetween. A plurality of rolling members 5, or balls in the illustrated embodiment, are provided in the guide channel to provide a relative linear motion between the intermediate and top tables 2 and 3 in Y direction.

This second embodiment allows to provide a wider surface area for the bottom and top tables 1a and 3a, which may be advantageous in some applications.

FIGS. 8 through 11 illustrate an X-Y table assembly constructed in accordance with a further embodiment of the present invention.

Figure 9:
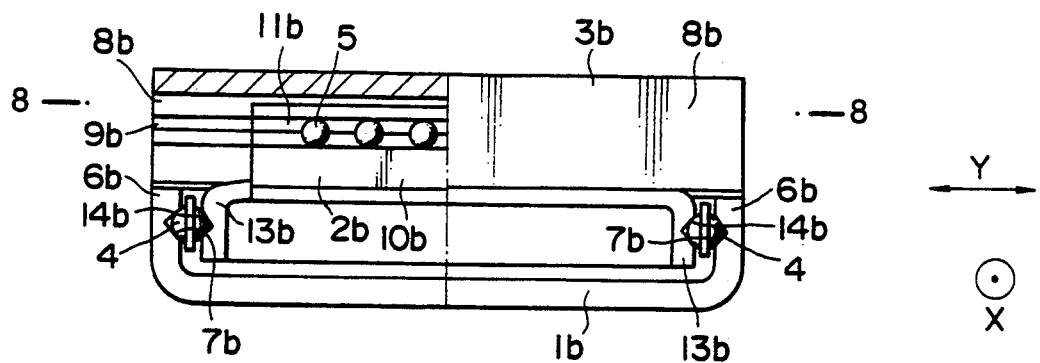
FIG. 9 is a schematic illustration showing partly in side elevation and partly in cross section the X-Y table assembly of FIG. 8 with the left half sections along line 9—9 indicated in FIG. 8.
Figure 10:
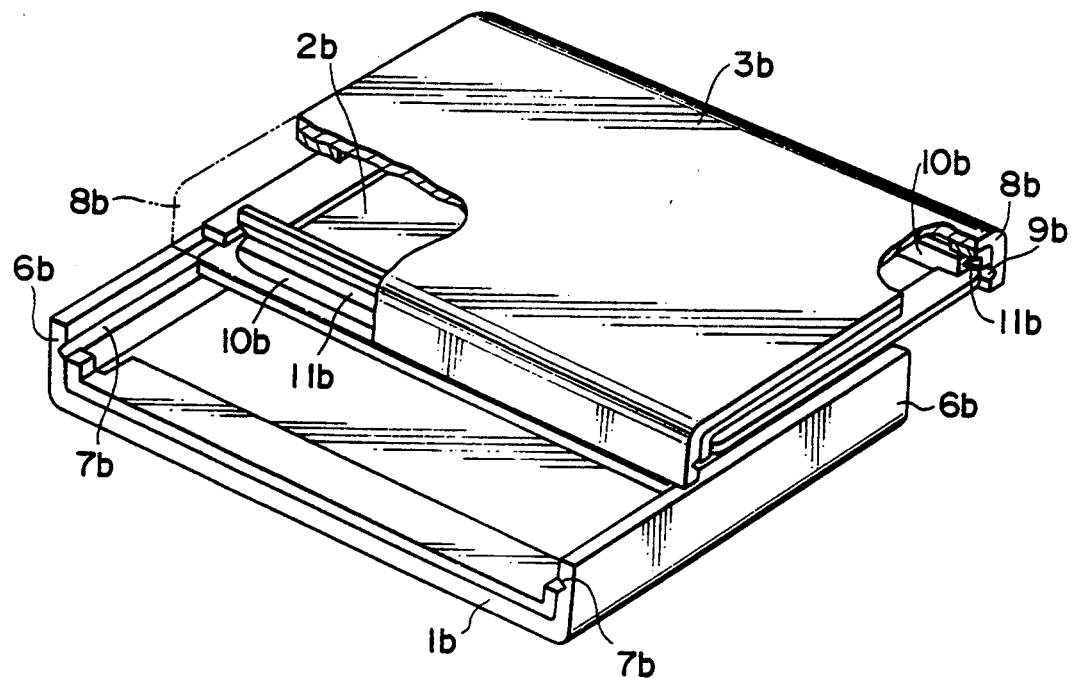
FIG. 10 is a schematic illustration showing in perspective view with parts broken away a relationship between the bottom, intermediate and top tables in the assembly of FIG. 8 with rolling members removed.
Figure 11:
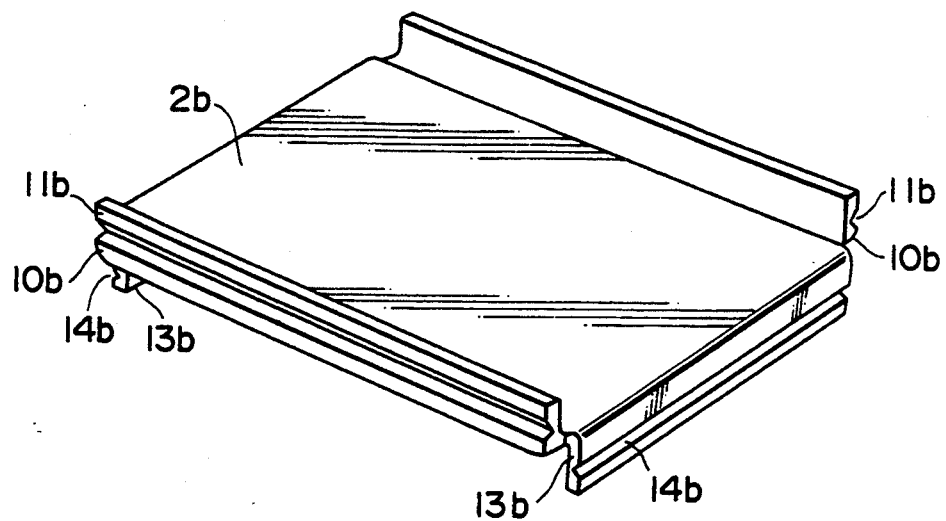
FIG. 11 is a schematic illustration showing in perspective view an intermediate table suitable for use in the assembly of FIG. 8.
Figure 12:
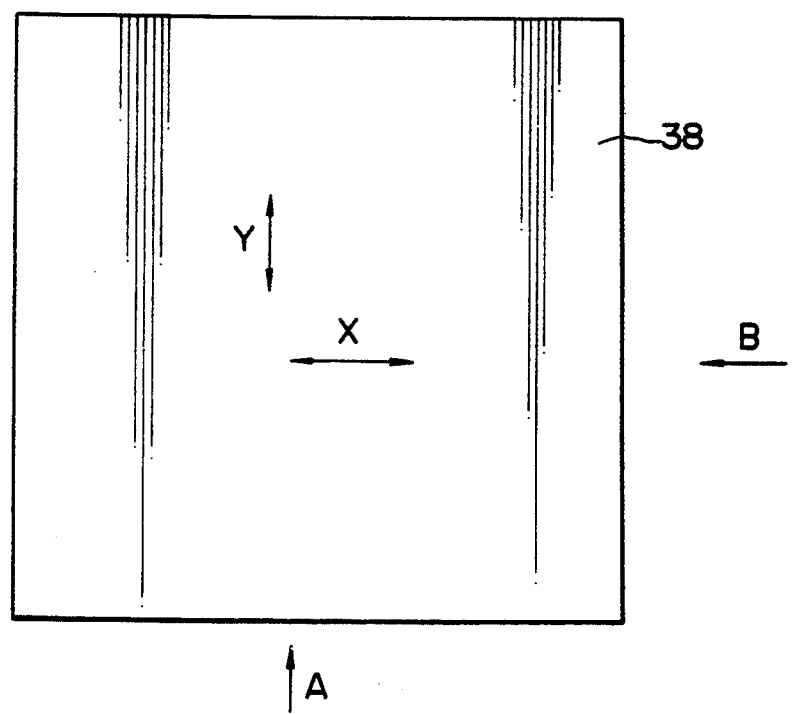
FIG. 12 is a schematic illustration showing in plan view a prior art X-Y table assembly.
Figure 13:
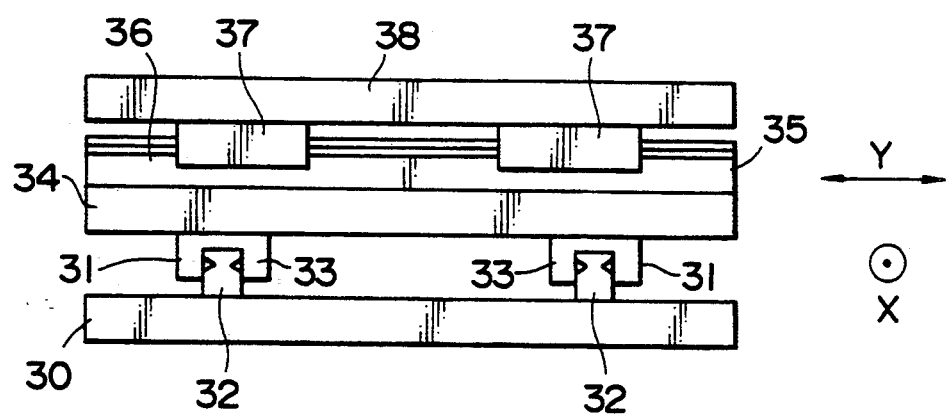
FIG. 13 is a schematic illustration showing in side elevation the table assembly of FIG. 12 when viewed in the direction of arrow A indicated in FIG. 12.
Figure 14:
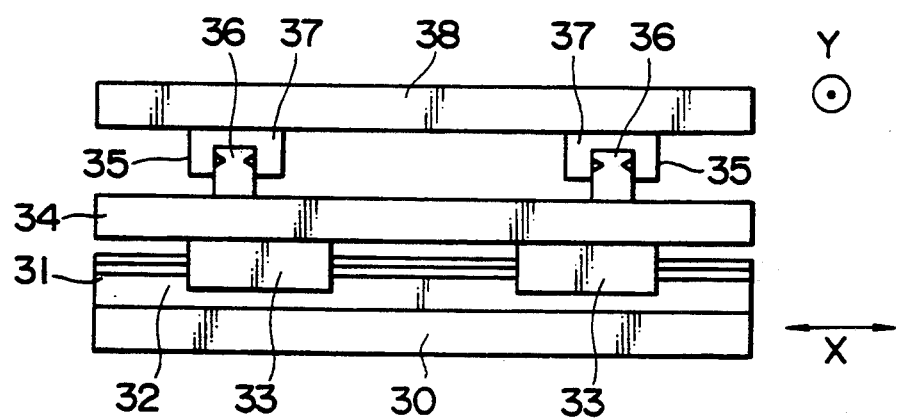
FIG. 14 is a schematic illustration showing in side elevation the table assembly of FIG. 12 when viewed in the direction of arrow B indicated in FIG. 12.
Figure 15:
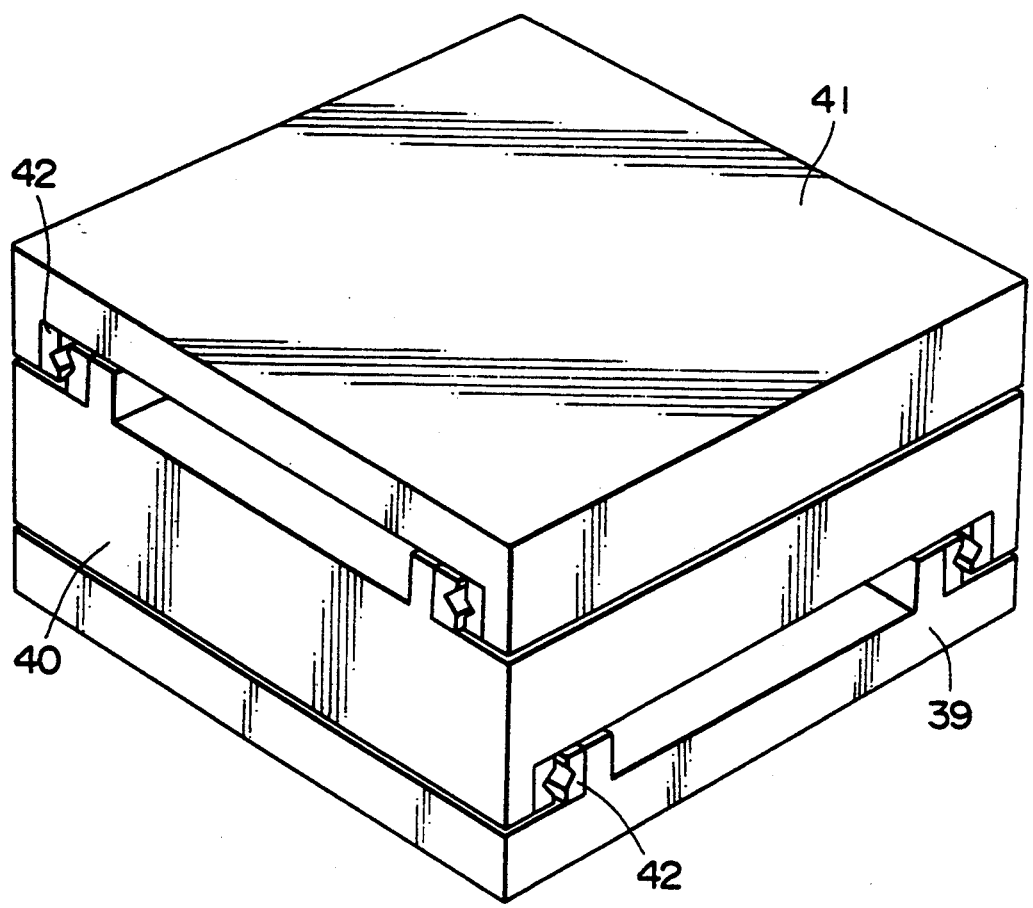
FIG. 15 is a schematic illustration showing in perspective view another prior art X-Y table assembly.

As shown, this embodiment also includes a bottom table 1b, an intermediate table 2b and a top table 3b which are all fabricated from a sheet metal by bending into a desired shape. As shown in FIGS. 9 and 10, the bottom table 1b includes a flat bottom wall section and a pair of vertically upwardly extending side wall sections 6b at its opposite sides so that the bottom table 1b has a generally U-shaped cross section. Each of the side wall sections 6b its formed with an outer guide groove 7b at is inner side surface. The intermediate table 2b is also fabricated from a sheet metal by bending a first pair of opposite side portions upwardly and a second pair of opposite side portions downwardly as best shown in FIG. 11. Thus, the intermediate table 2b includes a flat center wall section, a first pair of upwardly extending side wall sections 10b, each of which is formed with an inner guide groove 11b, and a second pair of downwardly extending side wall sections 13b, each of which is also formed with an inner guide groove 14b.

The downwardly extending side wall sections 13b of the intermediate table 2b are located in the space defined by the pair of opposite side wall sections 6b of the bottom table 1b such that the outer guide groove 7b is located opposite to and in parallel with an associated one of the inner guide grooves 14b to thereby define a guide channel therebetween. A plurality of rolling members 4, or balls in the illustrated embodiment are provided in the guide channels.

The top table 3b of the present table assembly is also fabricated from a thin sheet metal by bending into a desired shape. As best shown in FIG. 10, the top table 3b includes a flat top wall section and a pair of opposite side wall sections 8b, each of which is formed with an outer guide groove 9b located in opposite to and in parallel with an associated one of the inner guide grooves 11b of the intermediate table 2b, so that a guide channel is defined between a pair of oppositely located inner and outer guide grooves 11b and 9b. A plurality of rolling members 5, or balls in the illustrated embodiment, are provided in the guide channel to provide a rolling contact between the intermediate table 2b and the top table 3b.

This embodiment mainly relies on bending rather than cutting in manufacture so that it may be manufactured at a much lower cost. This embodiment also allows a relative translational motion between the bottom and top tables 1b and 3b in any desired direction. The guide grooves 6b, 7b, 8b, 9b, 10b, 11b, 13b and 14b of this embodiment all have a triangular cross sectional shape as different from the guide grooves 6, 7, 8, 9, 10, 11, 13 and 14 of the first embodiment and those 6a, 7a, 8a, 9a of the second embodiment, which are all circular in cross section. However, these guide grooves may have any desired cross sectional shape. In addition, use has been made of balls as rolling members 4 and 5 in all of the above-described embodiment, but use may be made of rollers in place of balls, if desired. In the latter case, however, the cross sectional shape of guide grooves are rather limited.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A table assembly comprising:
   a first table of unitary one-piece construction, which is bent into a first desired shade from a single sheet metal and which is formed with at least one first main guide groove;
   a second table of unitary one-piece construction, which is bent into a second desired shape from a single sheet metal and which is formed with at least one first auxiliary guide groove located to and in parallel with said first main guide groove to define a first guide channel therebetween extending in a first direction and formed with at least one second main guide groove;
   a third table of unitary one-piece construction, which is bent into a third desired shape from a single sheet metal and which is formed with at least one second auxiliary guide groove located opposite to and in parallel with said second main guide groove to define a second guide channel therebetween extending in a second direction different from said first direction;
   a plurality of first rolling members provided in said first guide channel;

a plurality of second rolling members provided in said second guide channel; and in which said first table has a generally U-shaped cross section including upstanding integral side wall sections each formed with one of said at least one first main guide grooves;

said second table having a pair of integral opposed vertically downwardly extending side wall sections each formed with one of said at least one first auxiliary guide grooves and a pair of integral opposed vertically upwardly extending sections extending perpendicular to said downwardly extending sections, each of said sections being formed with one of said at least one second main guide grooves;

said third table has an inverted U-shaped cross section including depending integral side wall sections each formed with one of said at least one second auxiliary grooves; and wherein pairs of said first guide channels extend between said first and second tables and pairs of said second guide channels extend between said second and third tables.

2. The table assembly of claim 1 in which the upstanding and depending wall sections of said first and third tables extend from a sheet metal cut out located intermediate of opposed edges of the respective sheet metals of said first and third tables.

3. The table assembly of claim 1 in which the side wall sections of each of the tables extend from opposed edges of the single sheet metal of each table.

* * * * *

UNITED STATES PATENT AND TRADEMARK OFFICE
CERTIFICATE OF CORRECTION

PATENT NO.   : 5,363,774
DATED        : Nov. 15, 1994
INVENTOR(S)  : Katsuya Anada, Yukio Yoshioka It is certified that error appears in the above-identified patent and that said Letters Patent is hereby corrected as shown below:

On the title Page:
    Insert [30] Foreign Application Priority Data delete "Dec. 7, 1991" and insert --July 12, 1991--.

Signed and Sealed this

Thirteenth Day of June, 1995

Attest:

BRUCE LEHMAN

*Attesting Officer*     *Commissioner of Patents and Trademarks*